United States Patent [19]
May

[11] Patent Number: 5,792,529
[45] Date of Patent: Aug. 11, 1998

[54] REINFORCED PLASTIC EXTRUSION

[75] Inventor: Michael M. May, Stillwater, Minn.

[73] Assignee: Intek Weatherseal Products, Inc., Hastings, Minn.

[21] Appl. No.: 361,093

[22] Filed: Dec. 21, 1994

[51] Int. Cl.⁶ .................. B32B 1/04; B32B 3/22; B32B 5/08; B32B 5/28
[52] U.S. Cl. .................. 428/36.2; 428/74; 428/76; 428/171; 428/172; 428/300.7
[58] Field of Search .................. 428/36.2, 68, 74, 428/76, 171, 172, 36.1, 297.4, 300.7

[56] References Cited

U.S. PATENT DOCUMENTS

| | | |
|---|---|---|
| 3,825,036 | 7/1974 | Stent . |
| 3,993,726 | 11/1976 | Moyer . |
| 4,093,693 | 6/1978 | Lemelson .................. 264/171 |
| 4,132,042 | 1/1979 | Di Maio . |
| 4,281,492 | 8/1981 | Schock et al. . |
| 4,381,273 | 4/1983 | Azzola . |
| 4,415,519 | 11/1983 | Strassel . |
| 4,422,992 | 12/1983 | Michel . |
| 4,432,179 | 2/1984 | Bachmann . |
| 4,563,843 | 1/1986 | Grether et al. . |
| 4,588,538 | 5/1986 | Chung et al. . |
| 4,668,571 | 5/1987 | Moriarty, Jr. . |
| 4,788,088 | 11/1988 | Kohl .................. 428/34.5 |
| 4,828,780 | 5/1989 | Luker . |
| 4,863,652 | 9/1989 | Chang . |
| 4,883,625 | 11/1989 | Glemet et al. . |
| 4,906,421 | 3/1990 | Plamthottam . |
| 4,927,675 | 5/1990 | Adams et al. . |
| 4,937,028 | 6/1990 | Glemet et al. . |
| 5,062,782 | 11/1991 | Tompkins et al. .................. 425/113 |
| 5,176,775 | 1/1993 | Montsinger . |

*Primary Examiner*—Marion E. McCamish
*Assistant Examiner*—Blaine R. Copenheaver
*Attorney, Agent, or Firm*—Merchant, Gould, Smith, Edell, Welter & Schmidt, P.A.

[57] ABSTRACT

A structural component is disclosed which includes first and second extrusions each consisting of a plurality of strengthening fibers. A third extrusion comprises a thermoplastic matrix that encapsulates the first and second extrusions. The three extrusions together define a non-planar cross sectional configuration of substantially transverse dimensions sufficient to provide component strength and stiffness. Also disclosed is an elongated structural component formed by extrusion consisting of a first extruded portion of a plurality of segments of strengthening fibers joined in a thermoplastic matrix and a second extruded portion comprising a thermoplastic matrix compatible with the first extruded portion. The first and second extruded portions together define a predetermined non-planar cross sectional configuration of substantially transverse dimensions sufficient to provide component strength and stiffness.

24 Claims, 4 Drawing Sheets

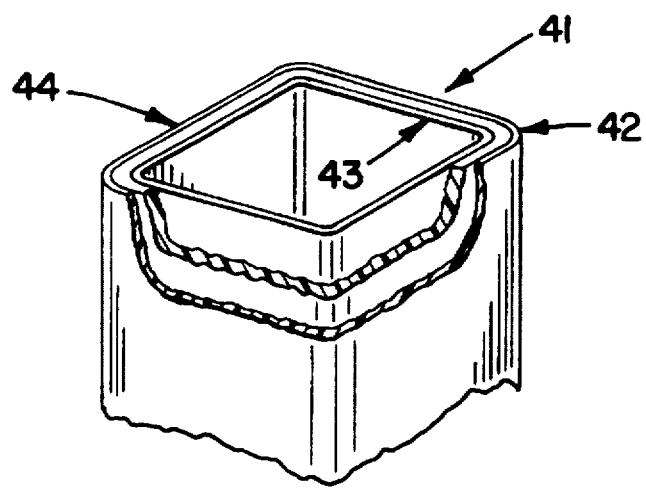
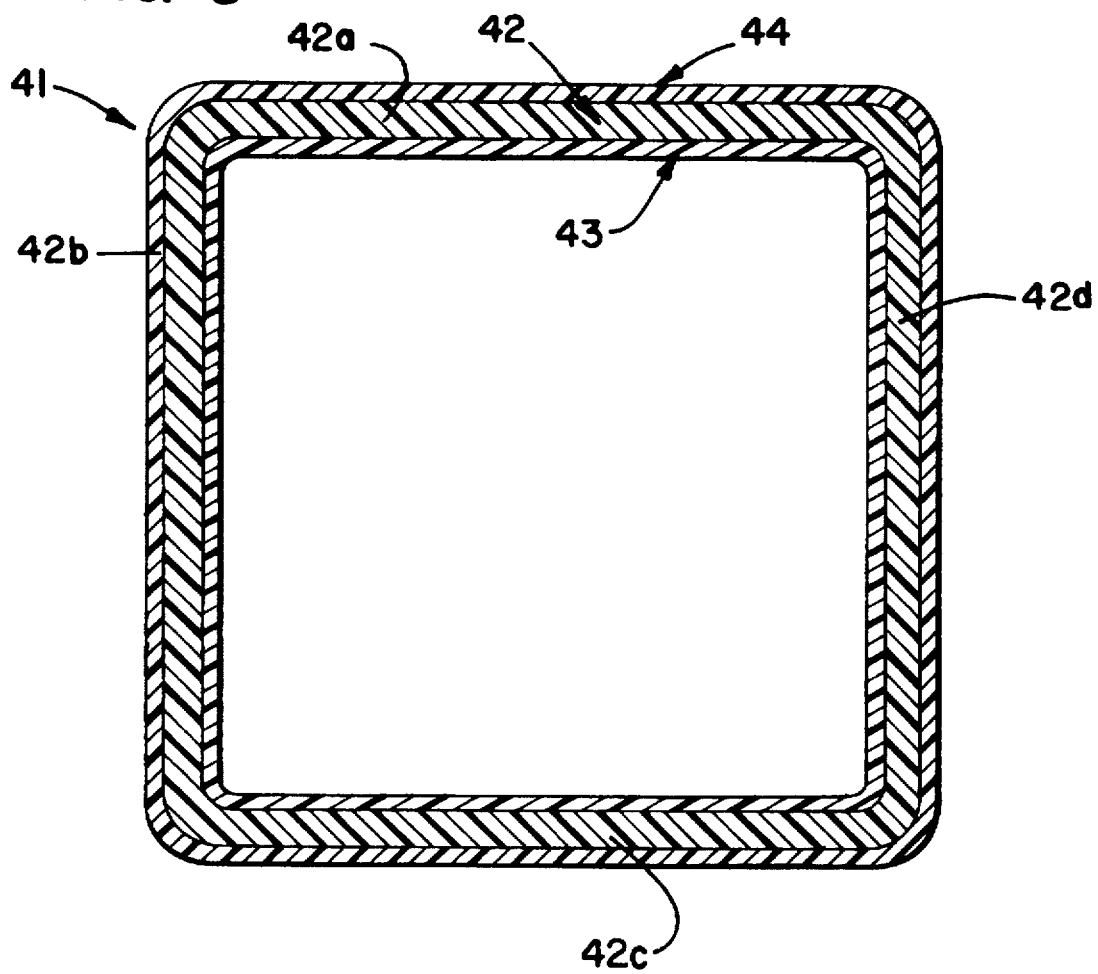

REINFORCED PLASTIC EXTRUSION

BACKGROUND OF THE INVENTION

The invention broadly relates to structural components and is specifically directed to extruded plastic components capable of use in the construction of window, doors and other closures that are exposed to a wide variance in temperature, humidity and other outside conditions.

External closure members such as windows and doors have traditionally been formed from wood components because of the availability of wood as a natural resource and the relative ease of manufacture. However, wood has a number of characteristics that do not lend themselves to window and door manufacture, including expansion/contraction as a function of humidity, the need for relatively high maintenance (e.g., initial and periodic painting or other coating), wear and degradation if ongoing maintenance procedures are not followed, and inconsistencies in the wood itself which results in linear as well as torsional warpage.

In recent years wood has become increasingly expensive due to a decreasing supply, and attempts therefore have been made to utilize other materials such as aluminum and plastic.

Extruded aluminum has a number of positive characteristics, but it is nevertheless undesirable because it is extremely high in thermal conductivity and hence a very poor insulator. Attempts have been made to join aluminum with a material having less thermal conductivity, and these attempts have met with some degree of success in the marketplace. However, new energy standards have made aluminum windows less competitive.

Thermoplastics such as polyvinyl chloride (PVC) have also been employed in the manufacture of windows. However, PVC lacks in overall strength and stiffness. At room temperatures, the stiffness of PVC is considerably lower than either wood or aluminum, and the stiffness degrades significantly with higher temperatures. Further, PVC expands/contracts significantly as a function of temperature.

However, because of their other favorable characteristics, thermoplastics have received developmental attention as structural components in general in an effort to overcome the inherent material deficiencies. For example, steel stiffeners have been added at strategic locations within cross sectional profiles of thermoplastics structural components. However, neither approach has been used to any degree of commercial success due to a variety of factors, including complexity and expense of manufacture.

Attempts have also been made to employ thermoset pultrusions as an alternative to wood and aluminum as structural components. Thermoset pultrusions are advantageous because they have relatively high strength and stiffness, a relatively low coefficient of thermal expansion and relatively low thermal conductivity. However, this technology also has a number of disadvantages, including very slow run rates and resulting costs and the difficulty to form complex parts. Further, tooling for thermoset pultrusions is very expensive and parts must be screwed or glued together. Last, thermoset pultrusions are similar to wood in that they need to be painted or otherwise coated for weatherability.

Broadly speaking, a number of attempts have been made to develop structural components for windows, doors and other closures from materials other than wood, but each of these alternative components has disadvantages that prevent it from being fully satisfactory in the marketplace.

The inventive structural components have resulted from a development focus on the simultaneous extrusion of two or more components (both crosshead extrusion and coextrusion) to create reinforced thermoplastic structural components having the strength and stiffness necessary for window construction, minimal expansion as a function of both temperature and humidity, which do not require initial painting or coating or periodic maintenance, and are less expensive relative to existing components.

In a first embodiment, the process of crosshead extrusion has been used to simultaneously extrude thermoplastic and a group of continuous filaments (e.g., glass filaments) in a desired profile in which the continuous filament group is strategically placed within the profile to obtain optimum strength and stiffness, as well as to reduce the linear expansion inherent in thermoplastics. In the preferred embodiment, the continuous filaments are preformed within a thermoplastic matrix to form a continuous tape, and the tape is continuously supplied to a crosshead extruder with a continuous flow of thermoplastic to form the component.

In the second embodiment, a coextrusion process is used to coextrude at least two strategically placed areas of high modulus material (e.g., glass fibers of finite length) within a profile of thermoplastic with the areas separated (e.g., a structural component taking the form of an I-beam) or contiguous (e.g., a structural component taking the form of a rectangular tube).

In both cases, the result is a structural component particularly suited to the manufacture of windows, doors and other closures, which is of considerable strength and stiffness, does not need to be painted or otherwise protectively coated, requires little if any maintenance, will not dent, and which has a coefficient of linear expansion that is significantly reduced relative to wood, aluminum or thermoplastic alone.

BRIEF DESCRIPTION OF THE DRAWINGS

FIG. 7 is a perspective view of a second alternative embodiment of a structural component embodying the invention; and FIG. 8 is a cross sectional view of the structural component of FIG. 7.

DESCRIPTION OF THE PREFERRED EMBODIMENTS

Figure 1:
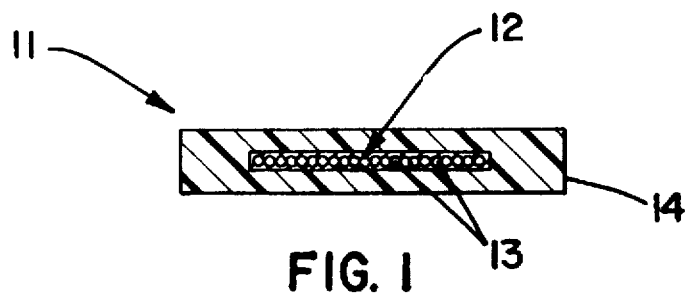
FIG. 1 is a cross sectional view of a structural component embodying the invention.
Figure 2:
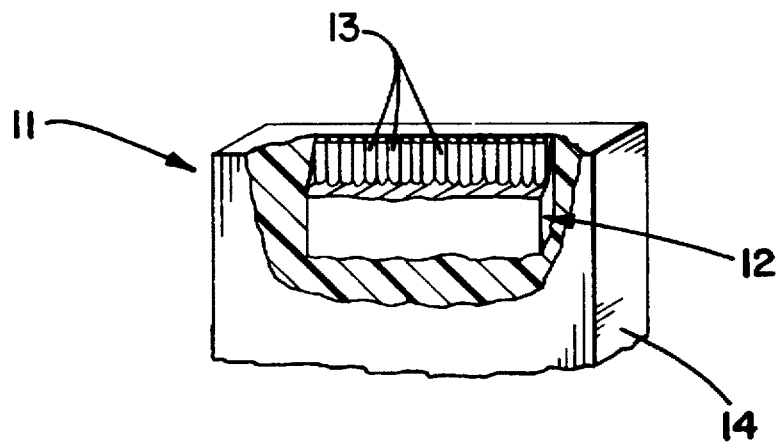
FIG. 2 is a perspective view of the structural component of FIG. 1 with portions thereof broken away.

With initial reference to FIGS. 1–2, a structural component embodying the invention is represented generally by the numeral 11. In this embodiment, the structural component 11 is an elongated component of finite length that is formed by crosshead extrusion as discussed in further detail below. In this embodiment, structural component 11 is of rectangular cross section although the configuration of the particular cross section or its length is not critical to the invention.

Structural component 11 comprises a first extruded portion 12 which itself consists of a relatively thin tape formed from a group of fibers or filaments 13 (see FIG. 2), each of which is continuous over the length of structural component 11. The filaments 13 are embedded in a thermoplastic matrix which holds them in a predetermined alignment or configuration. The filaments are formed from a non-thermoplastic material having a predetermined suitable tensile strength. One of the preferred forms is glass filaments, but the filaments may also be formed from or filled with carbon, kevlar, stainless steel or other suitable stranded material having comparable tensile strength.

The first extruded portion or tape 12 is commercially available and may be formed from the methods and processes disclosed in U.S. Pat. Nos. 3,993,726, 4,883,625 or 5,176,775. As such, the continuous tape 12 does not form a part of this invention. However, it is essential in structural component 11 that the fibers 13 be continuous over the length of structural component 11, that they be aligned or configured in a group to have a cooperative effect and that the tape 12 be strategically positioned within the cross section or profile of structural component 11 to accomplish a particular objective. In structural component 11, tape 12 is sized relative to the overall profile of a component, and it is centered within this rectangular profile to provide optimum strength and stiffness.

Structural component 11 further comprises a second extruded portion 14 in the form of thermoplastic. In the preferred embodiment, the thermoplastic extrusion 14 is polyvinyl chloride, which is easily extruded and fully encapsulates the continuous faces and edges of tape 12. The extreme end of tape 12 may also be encapsulated, but this is not essential to the invention because the continuously extruded component is preferably cut into desired finite lengths. The cutting mechanism is not shown and does not constitute a part of this invention.

The first and second extruded portions 12, 14 together define the preferred cross sectional configuration or profile of component 11, which in this particular embodiment is rectangular. It is reiterated that the first extruded portion or tape 12 consisting of the continuous longitudinal filaments 13 be disposed within the overall cross sectional configuration to best accomplish the strength characteristic desired in the structural component 11.

Figure 3:
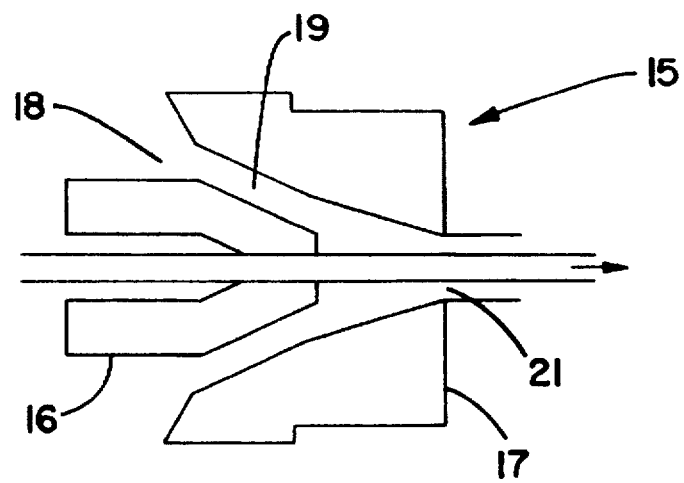
FIG. 3 is a schematic view of a crosshead die utilized in the manufacture of the structural component of FIGS. 1 and 2.

FIG. 3 is schematic representation of a crosshead die 15 utilized in the extrusion of first and second extruded portions 12, 14. Crosshead die 15 includes a centrally disposed mandrel 16 which receives a continuous length of tape 12 from a supply spool not shown. The mandrel portion 16 of crosshead die 15 corresponds in shape to the cross section of tape 12, and it is disposed within crosshead die 15 to position tape 12 properly within structural component 11.

Crosshead die 15 further comprises a die body 17 having an internal passage 18 in which mandrel 16 is disposed. An internal surface of die body 17 and an external surface of mandrel 16 together define a flow channel 19 which receives a continuous flow of melted thermoplastic material, and which merges with the output of tape 12 from mandrel 16. A die outlet 21 is of rectangular configuration and defines the profile of structural component 11. The extruded portions 12, 14 leave die outlet 21 in the desired rectangular configuration with tape member 12 disposed in the desired position within the profile.

A thermoplastic such as polyvinyl chloride has a number of advantageous characteristics as a material, but lacks the overall strength, stiffness and linear stability needed for large structural components. The crosshead extrusion of the continuous filament tape 12 provides significantly increased strength and stiffness to the component 11, and since the glass fibers 13 themselves are not subject to more than negligible linear expansion as a function of temperature and humidity, the grouped configuration acts to stabilize the polyvinyl chloride of second extrusion member 14; i.e., structural component 11 does not itself linearly expand or contract to any significant extent with increasing and decreasing temperature and humidity.

Figure 4:
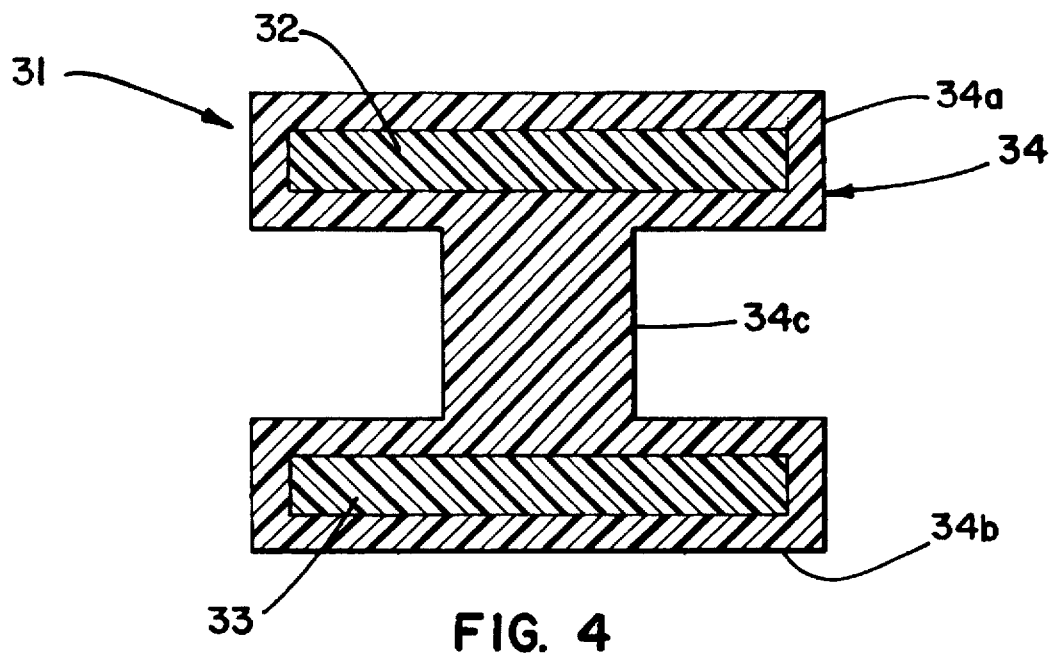
FIG. 4 is a cross sectional view of an alternative embodiment of a structural component embodying the invention.
Figure 5:
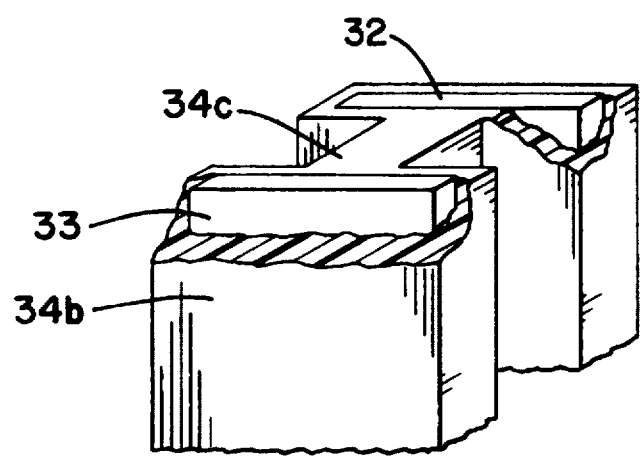
FIG. 5 is a perspective view of the structural component of FIG. 4 with portions thereof broken away.

These functions and advantages are also accomplished in the embodiment of FIGS. 4 and 5. In these figures, a structural component 31 comprises first and second extruded portions 32, 33, each of which comprises an extrusion of reinforcing high modulus material. In this embodiment, the preferred high modulus material consists of discrete (non-continuous) glass fibers of at least one quarter inch in length. Preferably, the fibers are about one-half inch in length, but they may also be one inch or longer. For extrusion purposes, such high modulus material is commercially available in pellet form, in which the discrete filaments are embedded in a thermoplastic matrix such as polyvinyl chloride (PVC), which can be heated to the point of being extrudable.

The first and second extruded portions 32, 33 are disposed remotely from each other in the embodiment of FIGS. 4 and 5 to accomplish maximum strength, stiffness and lineal stability.

Structural component 31 comprises a third extruded portion 34 that is coextruded with extruded portions 32, 33 in an encapsulating manner. Extruded portion 34 is formed from a suitable thermoplastic such as polyvinyl chloride, polypropylene or polyethylene. Extrusion 34 defines the cross section or profile of structural component 31, which in this embodiment is an I-beam comprising substantially parallel flanges 34a, 34b interconnected by a connecting portion or web 34c. In this embodiment, the third extruded portion 34 constitutes the entirety of web 34c, but it will be appreciated that an additional extrusion of high modulus material could be included to interconnect the first and second extruded portions 32, 33.

Figure 6:
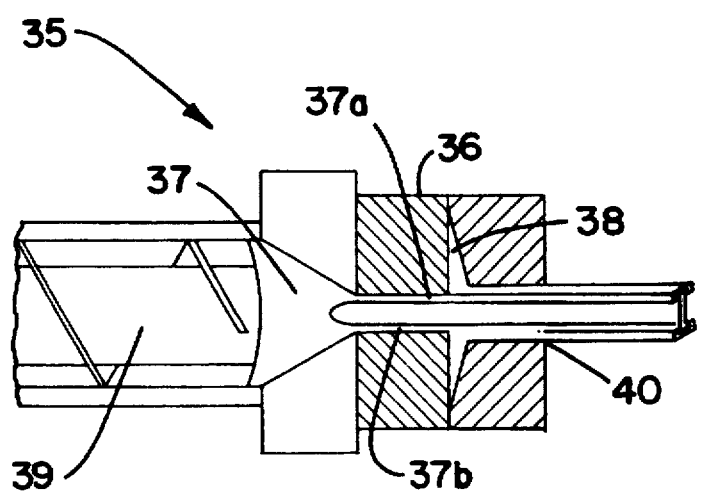
FIG. 6 is a schematic representation of a coextrusion die utilized in the manufacture of the structural component of FIGS. 4 and 5.

FIG. 6 is a schematic representation of a conventional coextrusion die 35. Coextrusion die 35 comprises a die body 36 defining a first extrusion channel 37 that receives a continuous flow of a first extrudable material. Channel 37 subdivides into channels 37a, 37b to define the extruded core portions 32, 33 of component 31. Die body 36 defines a second channel 38 that receives a continuous flow of a second extrudable material. Die 35 is mounted to an extruder 39 that is in direct communication with extrusion channel 37. The first extrudable material in channels 37a, 37b is extruded forward until it merges with the second extrudable material within channel 38, which encapsulates the first material. The coextruded material leaves the die outlet 40 in the die configuration, which in this case results in the coextruded I-beam 31.

The remote positioning of the first and second extrusions 32, 33 within the flanges 31a, 31b provide considerable strength, stiffness and lineal stability to structural component 31 which would not otherwise exist. As such, and for the reasons discussed above, the resulting structural component has particular application to the manufacture of windows and other externally exposed closures.

While the structural component 31 having remotely disposed extrudable portions of high modulus material is formed in a coextrusion die in FIG. 6, it would be possible to form these first and second extrudable portions from continuous glass filaments as in the first embodiment, in which case the structural component 31 would be formed in a crosshead die as shown in FIG. 3.

FIGS. 7 and 8 represent a third alternative embodiment that can be formed by crosshead extrusion or coextrusion, depending on the specific type of material employed as the high modulus stiffener. This structural component, which bears reference numeral 41, takes the form of a hollow, square tube.

Specifically, the square structural component 41 is laminate in nature, comprising a middle layer 42 sandwiched between inner layers 43 and 44. Middle layer 42 comprises four legs 42a–d of an equivalent length that are joined at the corner or juncture between legs. Whether formed by crosshead extrusion or coextrusion, the middle layer 42 comprises a single, continuous layer when viewed in cross section. However, it will be appreciated that the leg pairs 42a, 42c and 42b, 42d are remotely disposed in the same manner as the I-beam configuration of FIGS. 4 and 5, thus providing considerable inherent stiffness to component 41. This stiffness is enhanced by the fact that each of the leg pairs 42a, 42c and 42b, 42d is interconnected by the other leg pair.

From the standpoint of component analysis, each pair of adjacent legs (e.g., legs 42a, 42b) also provides inherent stiffness in the form of an angle beam. The invention is therefore not limited to the remotely disposed high modulus stiffening areas 32, 33 of the I-beam configuration of FIGS. 4 and 5, but rather also encompasses different areas of high modulus stiffeners that are joined and relatively angularly disposed (e.g., the legs 42a, 42b).

Whether the structural component includes areas of high modulus stiffeners that are remotely disposed (the embodiment of FIGS. 4–5) or joined at an angle (the embodiment of FIGS. 7–8), the simultaneous extrusion of two such areas provides stiffness and stability to the structural component that enables it to be used in structures such as windows and doors. Further, the encapsulating layer of unfilled material (i.e., the outer layer of each of the three embodiments which does not include fibers or filaments) provides an external surface that is particularly suited to the manufacture of external closures such as windows and doors because it does not require initial painting or other coating or maintenance to any degree. As a replacement for wood or aluminum, the inventive structural components provide all of the attributes of such materials but without the disadvantages.

What is claimed is:

1. An elongated structural component of finite length comprising:
   a first extrusion comprising a plurality of strengthening fibers formed into a group of predetermined configuration and joined in a first thermoplastic matrix, said group of fibers being continuous over the length of the structural component;
   a second extrusion comprising a second thermoplastic matrix compatible with said first thermoplastic matrix, the first extrusion being centrally disposed within the second extrusion and encapsulated thereby;
   a third extrusion comprising a plurality of strengthening fibers formed into a group of predetermined configuration and joined in a third thermoplastic matrix, said group of fibers being continuous over the length of the structural component;
   said first, second and third extrusions together defining a predetermined non-planar cross sectional configuration of substantial transverse dimensions sufficient to provide component strength and stiffness, and said first and third extrusions being disposed within said cross sectional configuration to accomplish a particular strength characteristic of said structural component.

2. The structural component defined by claim 1, wherein said first and third extrusions are remotely disposed within the cross section of the component.

3. The structural component defined by claim 1, wherein said first and third extrusions comprise leg portions interconnected at one end and being relatively angularly disposed.

4. An elongated structural component of finite length formed by coextrusion, comprising:
   a first extrusion comprising a plurality of strengthening fibers formed into a group of predetermined configuration;
   a second extrusion comprising a plurality of strengthening fibers formed into a group of predetermined configuration; and
   a third extrusion comprising a thermoplastic matrix that encapsulates said first and second extrusions;
   said first, second and third extrusions together defining a non-planar cross sectional configuration of substantially transverse dimensions sufficient to provide component strength and stiffness, with said first and second groups of fibers being disposed within said cross sectional configuration in relative positions to accomplish a particular strength characteristic of said structural component.

5. The structural component defined by claim 4, wherein the strengthening fibers of each of said first and second extrusions are non-continuous.

6. The structural component defined by claim 4, wherein said non-continuous fibers are at least about one-quarter inch in length.

7. The structural component defined by claim 6, wherein said continuous fibers are about one-half inch in length.

8. The structural component defined by claim 4, wherein non-continuous fibers comprise a non-thermoplastic material of predetermined tensile strength.

9. The structural component defined by claim 8, wherein said non-continuous fibers comprise glass filaments.

10. The structural component defined by claim 4, wherein the first and second extrusions are remotely disposed within the cross section of the component.

11. The structural component defined by claim 10, the cross section of which takes the form of an I-beam comprising substantially parallel first and second flange portions interconnected by a connecting portion, the first and second extrusions being respectively encapsulated within said first and second flange portions.

12. The structural component defined by claim 4, wherein the cross section of each of said first and second extrusions comprises an elongated leg encapsulated within the associated flange portion.

13. The structural component defined by claim 4, wherein said first and second extrusions comprise leg portions interconnected at one end and being relatively angularly disposed, said leg portions being encapsulated by the third extrusion.

14. The structural component defined by claim 4, wherein said third extrusion comprises polyvinyl chloride.

15. The structural component defined by claim 4, wherein said third extrusion comprises polypropylene.

16. The structural component defined by claim 4, wherein said third extrusion comprises polyethylene.

17. An elongated structural component of finite length formed by extrusion, comprising:
- a first extruded portion comprising a plurality of segments of strengthening fibers, each segment being formed into a group of fibers of predetermined configuration and joined in a thermoplastic matrix;
- a second extruded portion comprising a thermoplastic matrix compatible with the thermoplastic matrix of the first extruded portion;
- said first and second extruded portions together defining a predetermined non-planar cross sectional configuration of substantial transverse dimensions sufficient to provide component strength and stiffness, with said segments of strengthening fibers disposed within said cross sectional configuration to accomplish a particular strength characteristic of said structural component.

18. The structural component defined by claim 17, wherein said first extruded portion comprises two segments of strengthening fibers, said segments being remotely disposed within said cross sectional configuration.

19. The structural component defined by claim 18, wherein each of said two segments of strengthening fibers comprises a separate extrusion.

20. The structural component defined by claim 17, wherein said first extruded portion comprises a single extrusion of four segments of strengthening fibers, the four segments being interconnected to define a substantially rectangular tube.

21. The structural component defined by claim 20, wherein the second extruded portion encapsulates the outer surface of said rectangular tube, and which further comprises a third extruded portion comprising a thermoplastic matrix compatible with the other thermoplastic matrices and encapsulating the inner surface of said rectangular tube.

22. The structural component defined by claim 17, wherein each of said segments comprises a pre-formed tape having opposed faces and edges.

23. The structural component defined by claim 17, wherein said strengthening fibers are continuous over the length of said structural component.

24. The structural component defined by claim 17, wherein said strengthening fibers are at least about a quarter inch in length.

* * * * *